Aug. 11, 1953     R. P. SCHERER     2,648,463

PLASTIC CONTAINER WITH RUPTURABLE SEALED END

Filed May 8, 1948     2 Sheets-Sheet 1

INVENTOR.
Robert P. Scherer.
BY Bair & Freeman
Att'ys.

Aug. 11, 1953 R. P. SCHERER 2,648,463
PLASTIC CONTAINER WITH RUPTURABLE SEALED END
Filed May 8, 1948 2 Sheets-Sheet 2
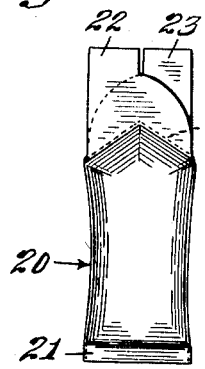
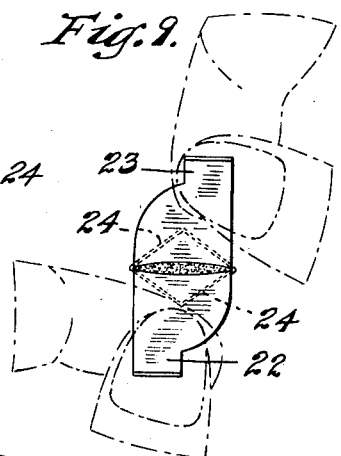
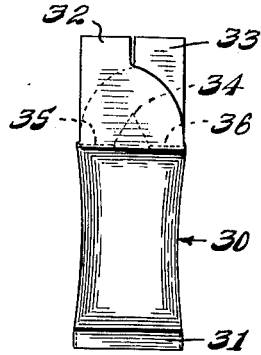
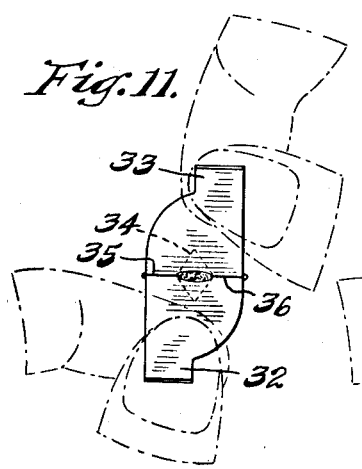
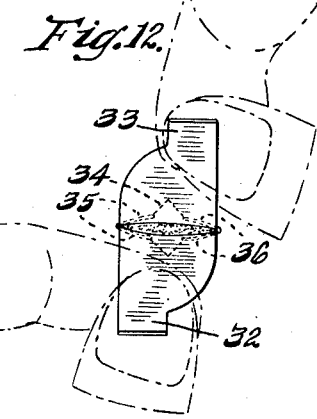
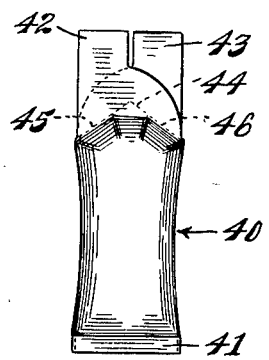
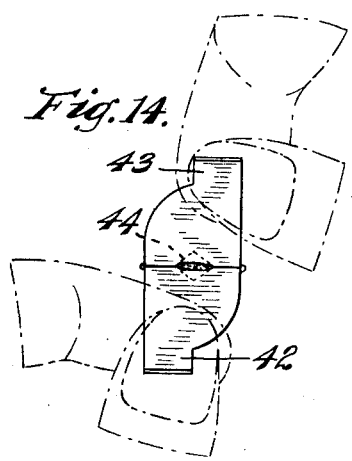
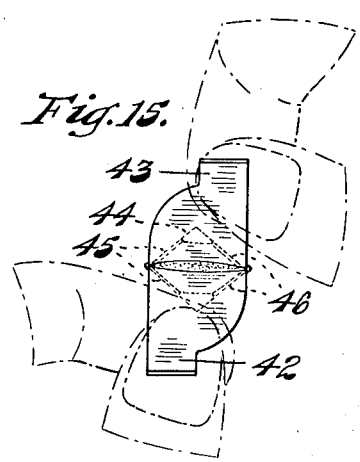
INVENTOR.
Robert P. Scherer.
BY
Bair & Freeman
Att'ys.

Patented Aug. 11, 1953

2,648,463

UNITED STATES PATENT OFFICE 2,648,463

PLASTIC CONTAINER WITH RUPTURABLE SEALED END

Robert Pauli Scherer, Detroit, Mich., assignor to R. P. Scherer Corporation, Detroit, Mich., a corporation of Michigan Application May 8, 1948, Serial No. 25,913

2 Claims. (Cl. 222—107)

This invention relates to an elastic or flexible container having a rupturable seal and to a novel process of producing the same.

Conventional disposable containers for materials such as tooth paste, shaving cream, and the like are ordinarily made of tubular sections of tin foil or the like sealed at one end and, at the other end, reinforced or otherwise rigidified and provided with a discharge orifice adapted to be closed by a separate removable closure member such as a screw cap. Such containers are inherently relatively expensive, since the reinforced end fitted with a screw cap is made up of material of a different thickness and requires a whole series of steps in its formation. Because of the relative expense of such containers, it has heretofore been found impractical to provide sealed or otherwise closed disposable containers of this general type either for relatively inexpensive materials to be packaged or for small amounts of relatively expensive materials.

I have now provided an inexpensive container adapted for the packaging and enclosing of various types of more or less finely divided solid materials, of pastes or liquids or of solid objects. My novel container is characterized by the fact that said container comprises an area or areas of lesser tensile strength than another area or areas and so distributed that the container, when subjected to manual tension, may be torn open, at the area or areas of least tensile strength. The area or areas of greater tensile strength may also be characterized by different tensile strengths, so that after the initial tearing of the area of least tensile strength (referred to herein above), further tearing may be effected through an area or areas of greater tensile strength. In this manner it is possible to provide, as required or desired, discharge apertures of any desired size and location. Further, the location and size of the discharge apertures may be predetermined, and a single container may have its discharge aperture enlarged from an initial relatively small size (for use when the container is relatively full) to a larger size (for use when the container has been more or less completely emptied). Finally, the container may originally form a hermetic or waterproof or otherwise tight seal for the contents thereof until opened, and the small discharge aperture opened initially may still be small enough to make possible preservation of the container contents during the time elapsing before the container aperture is further enlarged by further tearing. Thus, the container is completely sealed until initially torn open, and thereafter the discharge aperture can be kept at the minimum size required for emptying while a considerable amount of the container contents still remain in the container.

In the preparation of the containers of the present invention I employ synthetic thermoplastic resinous material selected from the class conventionally referred to as elastomers and characterized by ability to coalesce under pressure and at an elevated temperature below the melting point or softening temperature, to form a joint or seal or bond or weld, without the use of any adhesive, solvent, or coating material. In other words, the material of construction also functions as a sealing material. Further, the synthetic resinous material must be characterized by capacity for forming a homogeneous joint or bond or weld over a range of different temperatures and/or pressures, and the bonds or welds formed at these temperatures and/or pressures must be characterized by different tensile strengths. Thus, in one or several operations, by application over different areas of different temperatures and/or pressures, I can bond together overlapping or opposed sheets of synthetic thermoplastic material to form seals or bonds or welds having areas of different tensile strength.

In general, the thermoplastic synthetic resinous materials should be capable of coalescing over a temperature range of at least 5° C. falling somewhere below the actual softening point of the material. By the softening point I mean the temperature at which the material becomes pasty or flowable or easily deformable under light loads, for instance, 5 or 10 grams. Further, within the temperature range in question, the material should form homogeneous bonds or seals or welds having tensile strengths more or less proportional to the pressure and/or temperature applied. In other words, the material should be responsive to the application of various pressures and/or temperatures to form bonds that are characterized by correspondingly smaller or greater resistance to tearing. Preferably, the resinous material should be sensitive to variations in pressure, ranging from a fraction of a pound up to several hundred p. s. i., depending upon the temperatures employed.

It should further be understood that the resinous thermoplastic material, without the application of adhesives, solvents or coatings, and solely by the use of heat and pressure, should be capable of being coalesced or welded together to form joints or bonds or seals or welds characterized by a tensile strength that, when and where desired, is equal to the tensile strength of the material before coalescing, but characterized elsewhere, as desired, by graded reduced resistance to tension. Thus, it should be possible to predetermine the location and extent of any tearing through the container when subjected to manual tension effected with smaller or greater exertion, and the different tensile strengths in the various coalesced areas should be sufficiently sharply differentiated to respond selectively to manual tension without need for extreme care to prevent propagation of a tear past the desired area or areas.

Examples of synthetic material of the type indicated are copolymers of styrene and isobutylene, polymerized unsaturated esters, polyamide resins, methacrylate resins, vinyl type polymers and copolymers, and the like.

A convenient method of preparing the containers of the present invention comprises providing an open-ended tubular section of suitable thermoplastic synthetic resinous material and thereafter applying heat and pressure to the end portions of the section to seal or weld or bond or join the flattened opposed surfaces at the two ends. At one end, the coalescence should be so effected as to render that end as strong as the rest of the tube. At the other end, the areas of coalescence should be of graded tensile strength, so that a tear may be started at any desired point or area under relatively limited manual exertion and propagated only as far as may be desired. An adjacent area or areas may be characterized by a higher tensile strength, to arrest the propagation of the tear into such area or areas, under the influence of the initial manual tension but still permitting propagation of the tear on the application of greater manual tension. At the end to be torn, the areas of coalescence of graded tensile strength may be relatively narrow or almost linear, to predetermine closely the lines of tearing.

The bonding or joining or welding together of the two ends of the container may be effected simultaneously. In this event, the contents of the container must be disposed within the tubular section before the sealing operation is carried out. It is also possible first to close off one end of the container, then to fill the container, and finally to close off or seal the other end of the container.

The final container may be said to form a closed or tight seal for the contents thereof having a uniform composition throughout its extent and capable of being ruptured, at a predetermined location or locations, by the application of conveniently small graded manual tension, to render the contents accessible or capable of removal, as by liquid or plastic flow under the influence of gravity or of manual compression of the container. While the aperture effected by rupture or tearing is permanent, in the sense that the original bond or joint or weld or seal cannot ordinarily be fully restored by the ultimate purchaser and user of the package formed by the container and its contents, yet the cost of the container is so low that, if necessary or desired, it is practical to provide an individual container for each dose or portion of material to be used or consumed. For this purpose, it is possible to join together such individual containers by coalescing overlapping portions thereof to form a weld or joint or bond capable of being ruptured or broken by the application of relatively limited manual tension. Thus, an individual container having a rupturable seal may be separated from a number of such containers held together by rupturable bonds or welds, without necessarily rupturing the seal of the individual container being separated or the seals of the remaining containers.

The terms "tearing" and "tensile strength," as used in this application are explained as follows. The "tearing" (with consequent rupture as referred to hereinabove) relates to the separation of two opposed or overlapping sheets, sealed or bonded or joined or welded together in the manner described, by a force exerted normal to the sheets in question. Ordinarily, these sheets are characterized by high resistance against forces applied in the plane of the sheet, so that the sheets do not usually rupture when subjected to such forces. Further, the "tensile strength" referred to in this application relates specifically to resistance against forces applied normal or at an angle to, two sheets sealed or joined or welded or bonded together, for the purpose of tearing said sheets apart from each other. In other words, it is this resistance against forces applied transversely or at an angle to two overlapping or opposed sheets with which the present invention is particularly concerned.

It is therefore an object of the present invention to provide a novel seal or weld or joint or bond characterized by localized variations in resistance against rupture by contacting surfaces of the two areas of thermoplastic resinous material and applying heat and pressure with localized variations in intensity so as to provide a seal having an easily rupturable portion, of less tensile strength than other portions of said seal.

Another object is to provide a novel rupturable seal or joint or bond or weld between two areas of synthetic resinous material, by controlled application of heat and pressure, to effect coalescence of the material of said areas, without application of any coating or use of other material, and wherein one portion of the seal is rendered more readily rupturable than other portions by reason of it being of less tensile strength than other portions of the seal.

A further object is to provide a novel container formed of synthetic resinous thermoplastic material capable of coalescence at a temperature below its softening point and having marginal portions thereof sealed together by contacting said marginal portions and subjecting the same to controlled application of heat and pressure, and wherein said sealed marginal portions include a readily rupturable portion of less tensile strength than the remaining sealed portions.

And a still further object is to provide a novel container for objects or materials, together with a novel process of producing the container, and wherein the container comprises a body portion in the form of a tubular section of synthetic resinous material, having wall portions at the ends thereof flattened together and sealed by controlled application of heat and pressure, without application of any coating or use of other material, and wherein the seal at one end is formed with a rupturable portion of less tensile strength than other portions of said seal and/or the seal at the opposite end of the container.

Other objects and advantages of the present invention will be apparent from the following description, taken in connection with the accompanying drawing in which several containers, embodying the present invention, are shown diagrammatically by way of illustrative examples, and wherein:

Figure 8 is an elevational view of another container according to the present invention;

Figure 9 is a top view of the container of Figure 8 as opened;

Figure 10 is an elevational view of still another container according to the present invention;

Figure 11 is a top view of the container of Figure 10 as partially opened;

Figure 12 is a top view of the container of Figure 10 as completely opened;

Figure 13 is an elevational view of still another container according to the present invention;

Figure 14 is a top view of the container of Figure 13 as partially opened; and

Figure 15 is a top view of the container of Figure 14 as completely opened.

Figure 1:
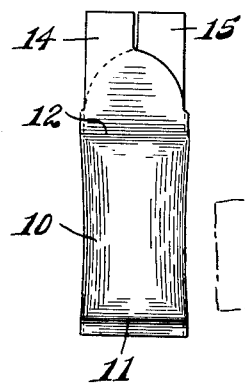
Figure 1 is an elevational view of a container embodying the present invention.

It is to be understood that the specific finger tab arrangement of the container, as illustrated in Figures 1 through 15, is not part of the present invention and constitutes the subject matter of an application for patent in the name of John Otto Scherer, Serial No. 59,940, filed November 13, 1948, now Patent No. 2,552,870.

The specific form of container illustrated in Figures 1 through 7, comprises a section or body of tubular material of the above indicated type, and is indicated generally by the reference numeral 10. The wall portions at opposite ends of the tubular body are flattened together and sealed as indicated at 11 and 12 respectively, by the controlled application of heat and pressure in any suitable manner. By reason of the characteristics of the material employed, a sealing action is effected by coalescence of the material of the contacting wall portions and this is accomplished without the application of any coating to said contacting surfaces or the use of any foreign material such as an adhesive or a solvent. Thus the seal forms a substantial bond between the two wall portions of the section of tubing when flattened together and subjected to the application of heat and pressure. It has been observed that in using materials of the general order above indicated, for forming a seal between two areas of said material, there does not result any change in the chemical characteristics of the material.

In forming the seals, I preferably employ temperatures in the range of 60° C. to 150° C. and pressures in the range of an application of a small fraction of a pound up to several hundred pounds. The particular temperature and/or pressure employed is dependent upon the particular material employed, as well as upon the tensile strength of the seal that is desired.

The container as illustrated in Figures 1 through 7 may for certain purposes, have its seals 11 and 12 formed simultaneously. For other purposes, the seal at one end may first be made and after introduction of the contents into the container, the seal at the opposite end may then be made. It is to be understood that the seal 12 is at the end of the container adapted to be opened, and the marginal portions of the flattened wall portions at this end of the container extend beyond the sealed area to constitute finger engaging portions 14 and 15. For convenience in illustration, the material is represented as many times the actual thickness thereof.

Figure 3:
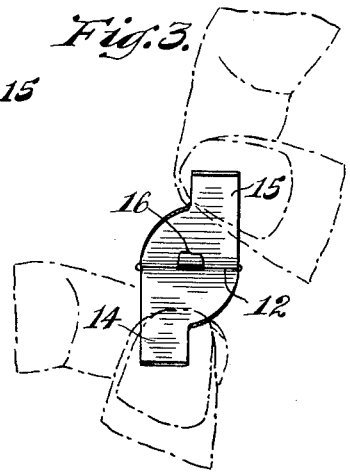
Figure 3 is a top view of the container of Figure 1 in process of opening.
Figure 2:
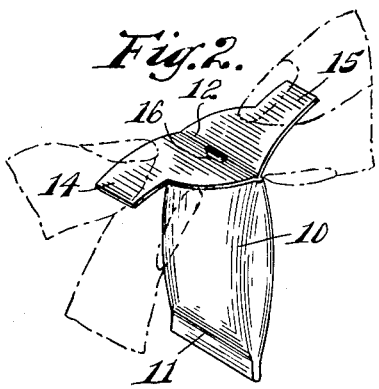
Figure 2 is a perspective view showing the container of Figure 1 in the process of being opened.
Figure 5:
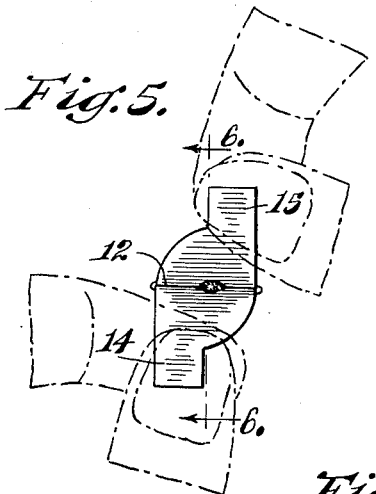
Figure 5 is a top view of the container of Figure 1 in opened condition.
Figure 4:
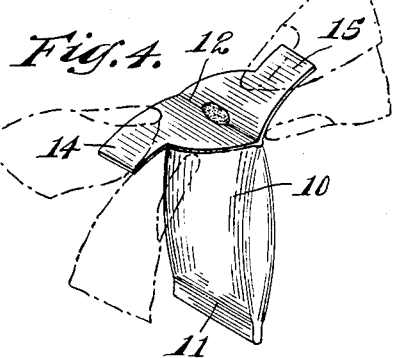
Figure 4 is a perspective view showing the container of Figure 1 with its rupturable seal broken so as to afford egress of the contents thereof.

In forming the seal at the end of the container adapted to be opened, namely the seal 12, it is preferred that at least a portion of the length of this seal, and, as indicated by the bracketed portion leading from the reference character 16, intermediate the length of the seal 12, is formed so as to be of less tensile strength than the remaining portion of said seal 12, so that it may be readily ruptured by pulling on the finger pieces 14 and 15 in opposite directions, by use of the fingers represented in dot and dash outlines, as indicated in Figures 2 and 3 inclusive, so as to effect a rupture of said portion 16 of the seal 12. Variations in tensile strength of the seals so as to provide a readily rupturable seal portion, as defined by reference numeral 16 is accomplished by the differential in temperatures or pressures or both as employed to create the seal. It is to be understood that if desired, depending upon the contents enclosed in the container, the entire length of seal 12 may be of less tensile strength than the seal 11, or at least of such low strength as to be readily ruptured upon pulling, in opposite directions, of the finger pieces 14 and 15.

As illustrated in Figures 1 through 7, the container is filled with paste-like material indicated generally at 18, which may for example, be toothpaste, shaving cream, cold cream, etc.

Figure 6:
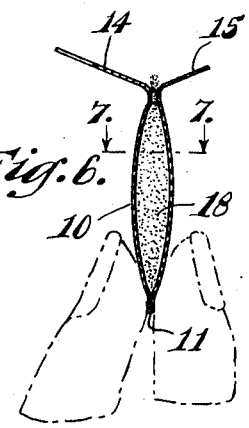
Figure 6 is a vertical sectional view through the container of Figure 1 taken substantially as indicated at line 6—6 on Figure 5.
Figure 7:
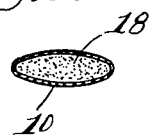
Figure 7 is a transverse sectional view through the container of Figure 1 taken as indicated at line 7—7 on Figure 6.

Thus, when the rupturable seal portion, indicated by the reference character 16, is ruptured or broken, then by reason of the body 10 of the container being of a flexible nature, slight pressure may be applied to the container in a manner as seen in Figure 6 for causing the paste-like material to exude through the opening produced by rupturing of the portion 16 of the seal 12.

In Figures 8 and 9 I have shown another container according to this invention generally indicated by the reference numeral 20. Similarly to the container of Figures 1 through 7, the container of Figures 8 and 9 is formed with a strong bottom seal 21 and, at the other end, with two finger engaging tabs 22 and 23 adapted, on being pulled apart manually, to rupture a seal 24 of relatively low tensile strength. Unlike the seal of the container of Figures 1 to 7, the seal 24 is angular or chevron-shaped, with an upwardly directed point or apex at which tearing is initiated when the tabs 22 and 23 are pulled apart, such tear or rupture then being propagated downwardly and outwardly to open the top of the container 20 completely, as shown in Figure 9.

Still another container according to the present invention is shown in Figures 10 through 12. Similarly to the containers described hereinabove, this container (indicated generally by reference numeral 30) is formed with a strong bottom seal 31 and, at the other end, with two finger engaging tabs 32 and 33 adapted, on being pulled apart manually, to rupture a seal made up of outer narrow transverse portions 35 and 36 connected by an inner triangular portion 34 tapering upwardly. These three seal areas are all susceptible to rupture by manual tension, but the seal portion 34 is characterized by less tensile strength than the areas 35 and 36, so that the area 34 may initially be torn open by relatively limited manual tension, and the resulting tear is propagated through the areas 35 and 36 only on exertion of greater manual tension. Thus, as shown in Figure 11, the area 34 may initially be ruptured, to provide an initial small discharge aperture which subsequently may be enlarged to open the container completely, as shown in Figure 12.

Still another form of container according to this invention is shown in Figures 13 through 15 and there indicated generally by the reference numeral 40. Again, this container is formed with a strong bottom seal 41, and at the other end, with two finger engaging tabs 42 and 43 adapted, on being pulled apart manually, to rupture a seal made up of a central triangular area 44 and outer inclined areas 45 and 46. The latter two areas extend angularly inwardly and upwardly to the triangular central area 44. The latter is relatively easily rupturable by manual tension. The areas 45 and 46 are characterized by greater tensile strength but are still susceptible to rupture by manual tension. Thus, by limited manual exertion, the seal area 44 may first be ruptured, as shown in Figure 14, to provide an initial small discharge aperture which may subsequently be enlarged by greater manual exertion to open the top of a container completely, as shown in Figure 15.

In the drawing, the middle of the rupturable seal has been exaggerated. While the seals may be as wide as shown, I prefer to make the seals of almost linear width, to predetermine within narrow limits the exact area within which a tear will be propagated.

By way of an example of the preparation of a container according to the present invention, a tubular section of styrene-isobutylene copolymer (such as is available commercially) may be slit lengthwise at one end along diametrically opposite lines, opposite end corners of the resulting tabs then being cut off, to leave the slit tube end in the condition illustrated in Figure 11. Next the other tube end is subjected to heat and pressure along its terminal area, to form the seal indicated in Figure 10 at 31. The tube may then be filled, for instance, with toothpaste. Finally, the slit tube end is subjected to heat and pressure over an angular transverse area, to form the seal indicated at 34, 35, 36 in Figure 10.

In forming the seal 31, the styrene-isobutylene copolymer is heated at least to its softening point and sufficient pressure is applied to form a strong bond. In forming the seal 34, 35, 36 on the other hand, the copolymer is heated only to a temperature below the softening point where the copolymer is still plastic and opposed surfaces are capable of coalescing under pressure. Further, the seal area 34 is subjected to less pressure than the seal areas 35 and 36 whereby the resulting bond or seal is somewhat weaker over the area 34 than over the seal areas 35 and 36.

The containers shown in the drawing have been described solely by way of illustrative examples. Other forms of containers also fall within the scope of this invention. For instance, it is possible to fold a sheet of plastic sheet material over upon itself to form an enclosure and to seal off this enclosure by causing opposing marginal surfaces of the sheet material to coalesce solely under the influence of heat and pressure, below the softening point of the material, as described. Or, two matching pieces of sheet material may be disposed one over the other, and the opposed marginal surfaces may be bonded together, as described. In either case, the tensile strength of the resulting bond may be varied locally as desired, from the maximum obtainable tensile strength to a relatively smaller tensile strength permitting manual localized tearing or rupturing.

Thus, although I have herein shown and described certain preferred embodiments of my invention, manifestly it is capable of modification without departing from the spirit and scope thereof. I do not, therefore, wish to be understood as limiting this invention to the precise embodiments herein disclosed, except as I may be so limited by the appended claims.

I claim as my invention:

1. As an article of manufacture, a completely enclosed container for objects or material comprising a tubular section of thermoplastic sheet material having the wall portions at opposite ends flattened and sealed together to effect closing of said container, the seal at one end extending transversely across said container in spaced relationship to said one end and having an angular configuration, the apex of said angular seal being turned toward said one end, said angular seal being progressively less resistant to opening toward the apex thereof, the opposed wall portions outside said angular seal being separated from each other by slots extending lengthwise of said container whereby said opposed wall portions may function as finger engaging tabs for transmitting seal opening force to the whole area of said angular seal beginning with the apex thereof.

2. An article according to claim 1 having said opposed wall portions formed with terminal portions extending side by side lengthwise of said article for facilitating grasping thereof.

ROBERT PAULI SCHERER.

References Cited in the file of this patent

UNITED STATES PATENTS

| Number | Name | Date |
|---|---|---|
| 1,592,584 | Viegelmann | July 13, 1926 |
| 1,668,782 | Roberts | May 8, 1928 |
| 2,147,817 | Johnson | Feb. 21, 1939 |
| 2,162,285 | Scott | June 13, 1939 |
| 2,234,065 | Vogt | Mar. 4, 1941 |
| 2,262,111 | Moore | Nov. 11, 1941 |
| 2,265,075 | Knuetter | Dec. 2, 1941 |
| 2,278,156 | Sterling | Mar. 31, 1942 |
| 2,334,600 | Boysen | Nov. 16, 1943 |
| 2,367,443 | Snyder | Jan. 16, 1945 |
| 2,373,285 | Baer | Apr. 10, 1945 |
| 2,405,675 | Southwick | Aug. 13, 1946 |
| 2,423,237 | Haslacher | July 1, 1947 |
| 2,474,619 | Farrell | June 28, 1949 |
| 2,488,212 | Lloyd | Nov. 15, 1949 |

FOREIGN PATENTS

| Number | Country | Date |
|---|---|---|
| 234,484 | Switzerland | Jan. 16, 1945 |